United States Patent
Falk et al.

(10) Patent No.: US 9,026,157 B1
(45) Date of Patent: May 5, 2015

(54) IDENTIFYING FREQUENCY BAND INTERFERENCE USING A FREQUENCY ACTIVITY RECORD OF A MOBILE DEVICE

(71) Applicant: Sprint Communications Company L.P., Overland Park, KS (US)

(72) Inventors: Alan Joseph Falk, Olathe, KS (US); Michael P. McMullen, Leawood, KS (US); Darrin Christopher Mott, Gardner, KS (US); Julie Ann Hart, Raymore, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 126 days.

(21) Appl. No.: 13/789,053

(22) Filed: Mar. 7, 2013

(51) Int. Cl.
*H04W 16/14* (2009.01)
*H04W 24/08* (2009.01)
*H04W 24/00* (2009.01)
*H04W 4/00* (2009.01)
*H04W 24/02* (2009.01)

(52) U.S. Cl.
CPC ............................... *H04W 24/02* (2013.01)

(58) Field of Classification Search
CPC ..... H04W 16/14; H04W 24/08; H04W 24/00; H04W 72/0453; H04W 4/00
See application file for complete search history.

(56) References Cited

U.S. PATENT DOCUMENTS

| | | | |
|---|---|---|---|
| 8,824,536 B1 * | 9/2014 | Garcia et al. ................. | 375/228 |
| 2008/0220787 A1 * | 9/2008 | Stanwood et al. ............ | 455/450 |
| 2012/0071188 A1 * | 3/2012 | Wang et al. ................... | 455/509 |
| 2014/0120975 A1 * | 5/2014 | Liu et al. ...................... | 455/509 |
| 2014/0253322 A1 * | 9/2014 | Chapin et al. ............. | 340/539.11 |

* cited by examiner

*Primary Examiner* — Bobbak Safaipour

(57) ABSTRACT

Methods and systems for identifying frequency band interference based on a mobile device activity record. The mobile device activity record may include a plurality of frequencies used by the mobile device and for each frequency in the plurality of frequencies a geographic location where the frequency was used. The mobile device activity record is received and compared to a spectrum license record that lists an assigned frequency band for an assigned geographic location. The assigned frequency band and assigned geographic location may be licensed to a frequency carrier. It is determined that that a frequency band interference has occurred based on identifying a frequency in the mobile device activity record when, according to the spectrum license record, the frequency is not licensed to a frequency carrier for the mobile device, in the geographic location where the frequency was used.

20 Claims, 7 Drawing Sheets

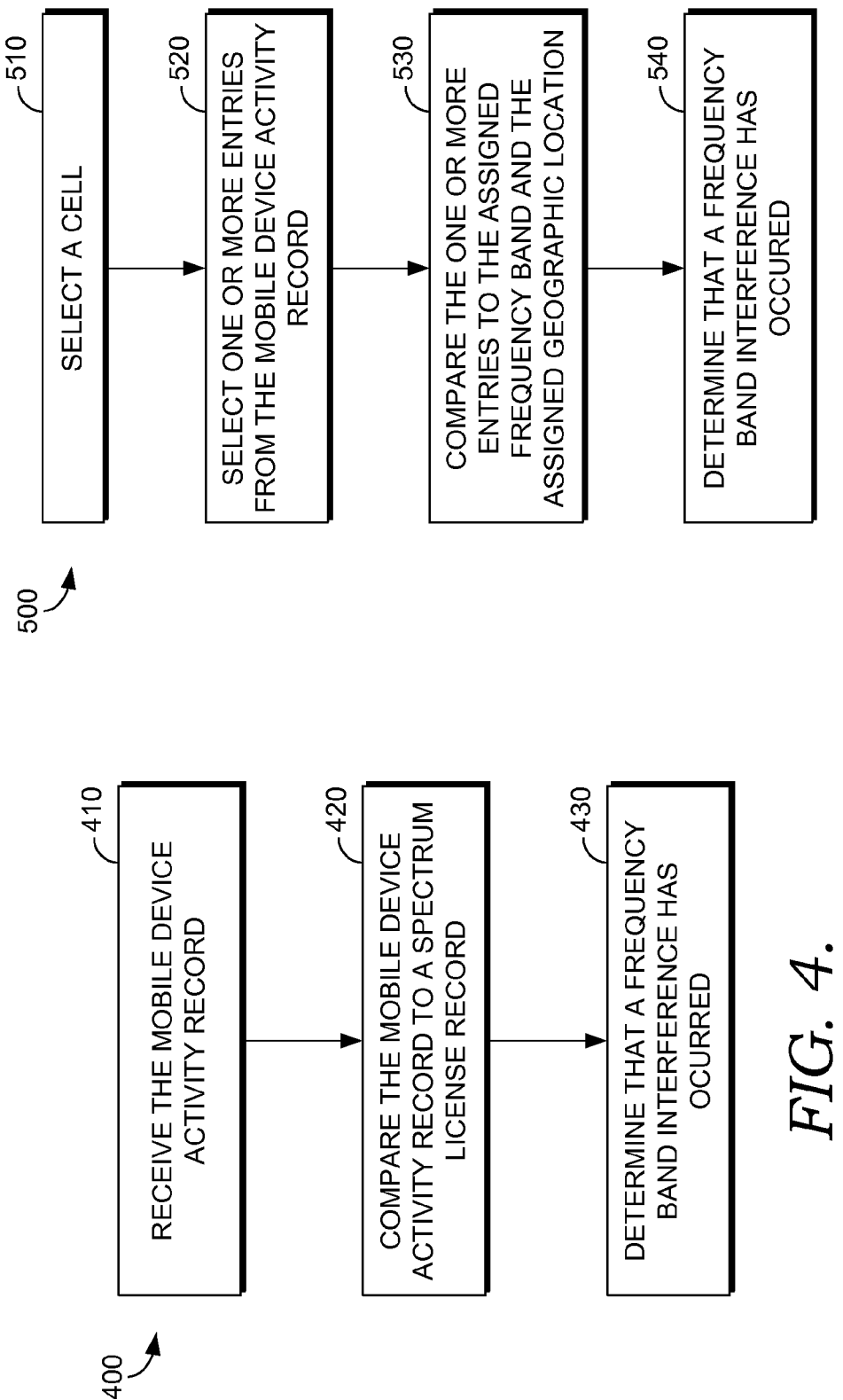

IDENTIFYING FREQUENCY BAND INTERFERENCE USING A FREQUENCY ACTIVITY RECORD OF A MOBILE DEVICE

SUMMARY

A high-level overview of the invention is provided here to disclose and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, systems and methods for identifying frequency band interference based on a mobile device activity record. The mobile device activity record may include a plurality of frequencies used by the mobile device and for each frequency in the plurality of frequencies a geographic location where the frequency was used. The mobile device activity record is received and compared to a spectrum license record that lists an assigned frequency band for an assigned geographic location. The assigned frequency band and assigned geographic location may be licensed to a frequency carrier. It is determined that a frequency band interference has occurred based on identifying a frequency in the mobile device activity record when, according to the spectrum license record, the frequency is not licensed to a frequency carrier for the mobile device, in the geographic location where the frequency was used. Identifying frequency band interference may refer to potential or actual interference; potential interference refers to a transmission error that does not in fact interfere with another transmission but could, and actual interference refers to a transmission error that in fact interferes with another transmission.

BRIEF DESCRIPTION OF THE SEVERAL VIEWS OF THE DRAWINGS

Illustrative embodiments of the present invention are described in detail below with reference to the attached drawing figures, and wherein:

FIG. 4 depicts a flowchart illustrating a method for identifying frequency band interference of a frequency carrier based on a mobile device activity record, in accordance with an embodiment of the present invention; and FIG. 5 depicts a flowchart illustrating a method for identifying frequency band interference of a frequency carrier based on a mobile device activity record, in accordance with an embodiment of the present invention.

DETAILED DESCRIPTION

Figure 1:
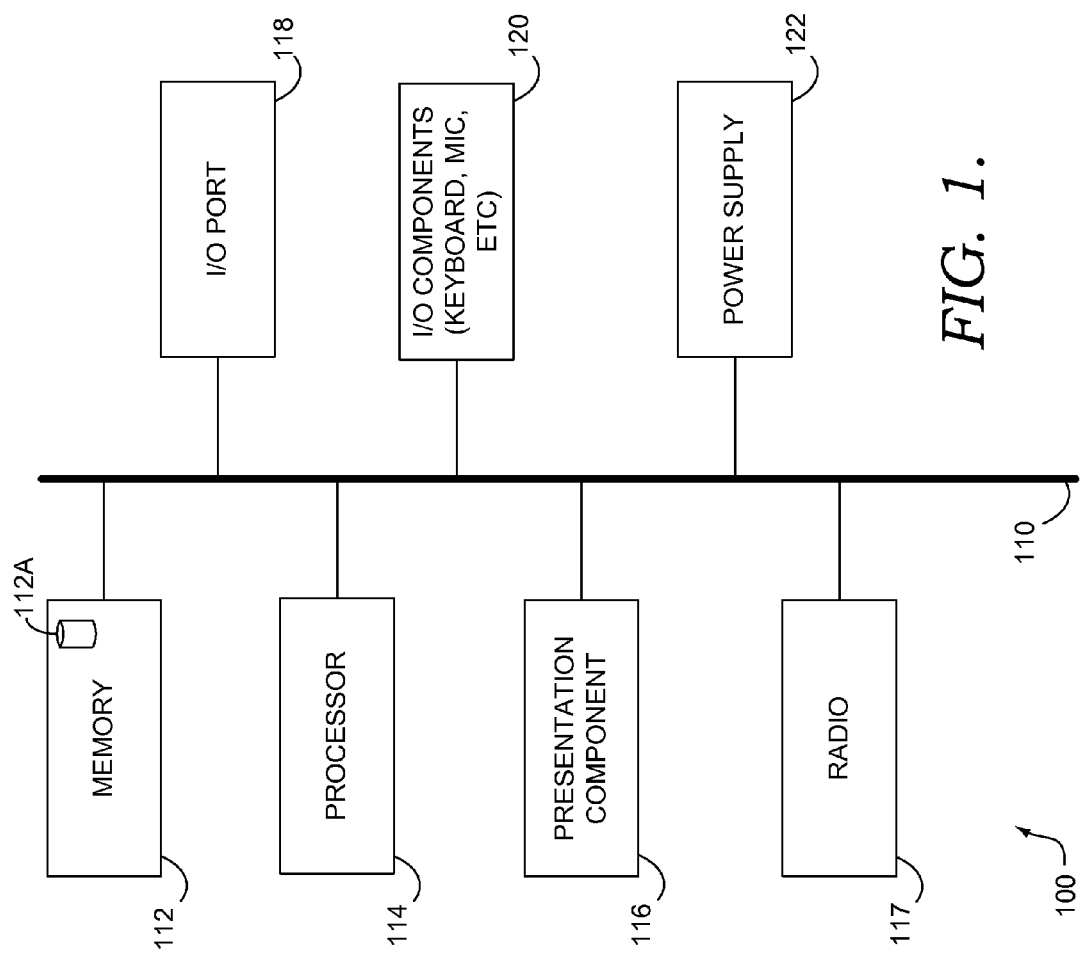
FIG. 1 depicts a block diagram of a mobile device in accordance with an embodiment of the present invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

BSC Base Station Controller
BTS Base Transceiver Station
CDMA Code Division Multiple Access
eNodeB Evolved NodeB
FCC Federal Communications Commission
GGSN GPRS Gateway Support Node
GNSS Global Navigation Satellite System
GPRS General Packet Radio Service
GSM Global System for Mobile communications
IP Internet Protocol
LTE Long Term Evolution
MME Mobile Management Entity
PDA Personal Data Assistant
PDSN Packet Data Serving Node
PGW Packet Gateway
QoS Quality of Service
RAN Radio Access Network
RAT Radio Access Technology
RNC Radio Network Controller
SGW Serving Gateway
TDMA Time Division Multiple Access
UMTS Universal Mobile Telecommunications System Further, various technical terms are used throughout this description. An illustrative resource that fleshes out various aspects of these terms can be found in Newton's Telecom Dictionary, 25th Edition (2009).

Embodiments of our technology may be embodied as, among other things, a method, system, or set of instructions embodied on one or more computer-readable media. Computer-readable media include both volatile and nonvolatile media, removable and non-removable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

A radio frequency (hereinafter "frequency") is an important resource in wireless communication networks. A frequency may be used for commercial and social benefits. Frequency allocation or spectrum allocation, i.e., the assignment of frequency bands for specific purposes, may be regulated by the governments in most countries. For example, the FCC of the United States manages and regulates all domestic non-federal spectrum use. Spectrum management through frequency allocation allows for licensing specific frequency bands within geographic locations or boundaries. For example, cellular frequencies may be set for particular frequency ranges or bands (e.g., ultra high frequency band) and allocated for cellular phone use. And then, wireless communications network providers or frequency carriers may then license frequency bands to implement different types of RANs (e.g., LTE, EVDO, and CDMA) and provide functionality using frequencies within an allocated frequency band. In particular, specific frequency bands may be licensed to particular frequency carriers for use within limited geographic locations. For example, a frequency carrier may be associated with 800 MHz band for voice frequencies, 1900 MHz band for 3G, and 800 MHz, 1900 MHz and 2500 MHz bands for 4G to use across a city.

Frequency carriers may try to avoid broadcasting on a frequency that is not assigned to the frequency carrier or in a geographic location not assigned to the carrier; however these efforts may be thwarted for several different reasons (e.g., frequency selection error, antenna orientation). Such broadcasting activity may cause interference with another frequency carrier that is rightfully licensed to broadcast on the frequency band within the geographic location. As such, there may be financial and/or legal penalties because of the frequency band interference of the frequency carrier.

Embodiments of the present invention provide an efficient method for identifying frequency band interference of a frequency carrier, using a mobile device activity record. A determination that a frequency band interference has occurred may be based on identifying a frequency in the mobile device activity record when, according to the spectrum license record, the frequency is not licensed to the frequency carrier for the mobile device, in the geographic location where the frequency was used. For purposes of a detailed discussion below, a wireless communications network including a mobile device supporting one or more RATs is described. Further, while embodiments of the present invention may generally refer to the components described, it is understood that an implementation of the techniques described may be extended to cases with different components carrying out the steps described herein.

Further, embodiments of the present invention utilize the mobile device activity record and the spectrum license record. The mobile device activity record identifies the frequency on which a mobile device was operated and the geographic location from which the frequency was used. For example, the mobile device activity record may at least include a frequency (e.g., MHz) and a location (e.g., latitude and longitude). It is advantageous to use the mobile device activity record over other methods (e.g., a spectrum analyzer) because the activity of mobile devices that are subscribed to a wireless communication network operator or frequency carrier may be leveraged to measure signals and frequencies from a network. For example, interference across international borders may be easily identified based on mobile device activity from an international geographic location using a national frequency. The measurements received from the mobile device activity record provide access, volume, and expediency that would otherwise be very difficult.

Further, the spectrum license record identifies the licensed frequency band and the geographic boundaries for using the licensed frequency band. Licensed frequency bands may be associated with a plurality of different frequency carriers. One such frequency carrier is associated with the mobile device. As such, the mobile device activity record may be compared to the spectrum license record to identify frequency band interferences. When a mobile device is identified operating on a frequency in a geographic location that the frequency carrier of the mobile device is not licensed to transmit in, a frequency band interference is determined. Identifying transmission errors from networks, using the mobile device activity, provides a proactive way of responding to transmission errors when interference has actually occurred and provides a way of quickly identifying interference with a transmission from a rightfully licensed frequency carrier. In embodiments, a specific cell (e.g., eNodeB or geographic location) is selected and the spectrum license record for the cell is compared to mobile device activity records associated with the cell to identify frequency band interferences.

In a first aspect of the present invention, computer-readable media having computer-executable instructions embodied thereon that, when executed, enable a computing device to perform a method for identifying frequency band interference based on a mobile device activity record. The method includes receiving the mobile device activity record. The mobile device activity record comprises a plurality of frequencies used by the mobile device and for each frequency in the plurality of frequencies a geographic location where the frequency was used. The method also includes comparing the mobile device activity record to a spectrum license record that comprises an assigned frequency band for an assigned geographic location. The method further includes determining that a frequency band interference has occurred based on identifying a frequency in the mobile device activity record when, according to the spectrum license record, the frequency is not licensed to a frequency carrier for the mobile device, in the geographic location where the frequency was used.

In a second aspect of the present invention, computer-readable media having computer-executable instructions embodied thereon that, when executed, enable a computing device to perform a method for identifying frequency band interference based on a mobile device activity record. The method includes selecting a cell having an assigned frequency band for an assigned geographic location. The method also includes selecting from the mobile device activity record associated with the cell, one or more entries having a frequency and a geographic location where the frequency was used. The method also includes comparing the one or more entries having the frequency and the geographic location to the assigned frequency band and the assigned geographic location. The method further includes determining that a frequency band interference has occurred based on identifying a frequency in the mobile device activity record when, according to the spectrum license record, the frequency is not licensed to a frequency carrier for the mobile device, in the geographic location where the frequency was used.

In a third aspect of the present invention, a system is provided for identifying frequency band interference based on a mobile device activity record. The system includes a mobile device configured for generating the mobile device activity for the mobile device activity record. The mobile device activity record includes a plurality of frequencies used by the mobile device and for each frequency in the plurality of frequencies a geographic location where the frequency was used. The system also includes a frequency band interference component configured for receiving the mobile device activity record. The frequency band interference component is also configured for comparing the mobile device activity record to a spectrum license record that comprises an assigned frequency band for an assigned geographic location and determining that a frequency band interference has occurred based on identifying a frequency in the mobile device activity record when, according to the spectrum license record, the frequency is not licensed to a frequency carrier for the mobile device, in the geographic location where the frequency was used.

Turning now to FIG. 1, a block diagram of an illustrative mobile device is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display and a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touchscreens, and any other item usable to directly or indirectly input data into mobile device 100. Power supply 122 includes items such as batteries, fuel cells, or any other component that can act as a power source to power mobile device 100.

Figure 2:
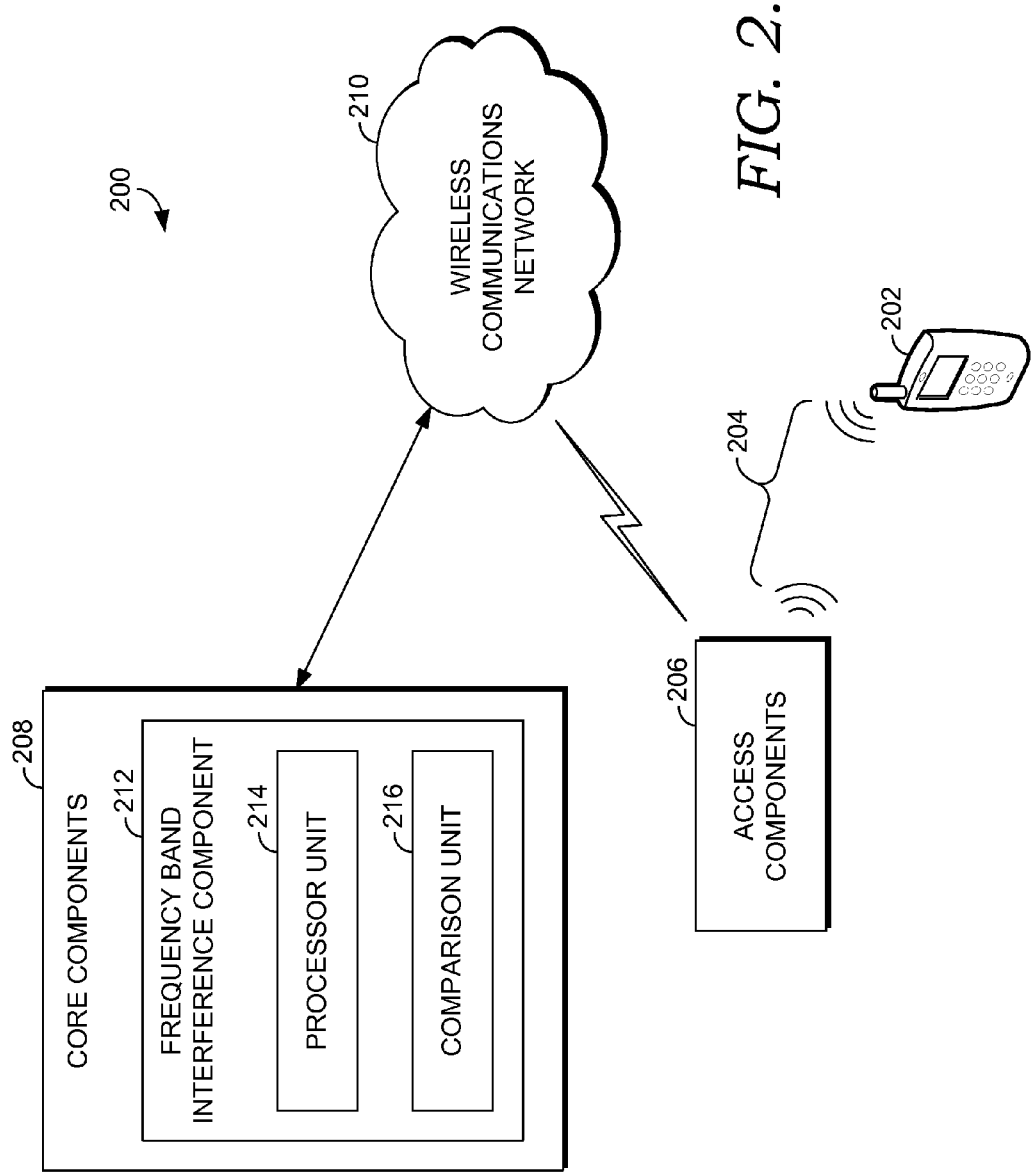
FIG. 2 depicts an illustrative networking environment for carrying out embodiments of the present invention.

FIG. 2 depicts an illustrative operating environment, referenced generally by the numeral 200, and illustrates a networking environment 200 that enables identifying frequency band interference of a frequency carrier based on a mobile device activity record. Mobile device 202, in one embodiment, is the type of device described in connection with FIG. 1 herein. Mobile device 202 communicates with access components 206 and core components 208 by way of a communications link 204. Communications link 204 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi connection to a device (e.g., mobile hotspot) that provides access to a wireless communications network, such as a WLAN connection using 802.11 protocol. A long-range connection may include a connection using one or more of CDMA, GPRS, GSM, TDMA, LTE, and 802.16. In embodiments, mobile device 202 may include a client service that helps carry out aspects of the technology described herein. The client service may be a resident application on the handset, a portion of the firmware, a stand-alone website, or a combined application/web offering that is used to facilitate generating and transmitting information relevant to identifying frequency band interferences. Whenever we speak of an application, software, or the like, we are really referring to one or more computer-readable media that are embodied with a set of computer-executable instructions that facilitate various actions to be performed. For readability purposes, we will not always include this lengthy terminology.

Generally, access components 206 and core components 208 provide and manage the resources of a wireless communications network 210. The access components 206 provide access to the wireless communications network 210. A wireless communications network 210 may comprise one or more of the components illustrated in FIG. 2. Not all components that make up a wireless communications network 210 are shown. Also, not all connections or possible connections are shown. The wireless communications network 210 may be distributed over land areas called cells, each served by at least one fixed-location transceiver also known as a cell or cell site. A cell or cell site may also refer to where antennas and electronic communications equipment which a function as access components 206. A cell or cell site may also be associated with a geographic location or sector name. The access components 206 may be, depending on the radio access technology associated with the wireless communications network 210, one or more of an eNodeB, a BTS, and other devices that facilitate communication between mobile device 202 and wireless communication network 210. In one embodiment, access components 206 may further include a BSC that acts as the intelligence behind a BTS and handles allocation of radio channels, receives measurements from mobile devices, and controls handovers from one BTS to another BTS.

In operation, the access components 206 may be configured to operate on a selected frequency band within a geographic location (e.g., a cell). The selected frequency band may be based on a spectrum license to the frequency carrier associated with the access components 206. The selected frequency band may comprise a plurality of channels. The access components 206 may transmit data on frequencies within the frequency band, in the geographic location for which the spectrum license is granted to the frequency carrier. An adjacent cell may be may be configured on a different selected frequency. The access components 206 may be calibrated to achieve the desired coverage within the particular geographic location. By limiting the coverage within the geographic location, the same selected frequency band may be used to cover different geographic locations that are separated from one another by a distance large enough not to cause interference. However interference may occur if the access components 206 transmit a signal on a frequency within a geographic location for which a frequency carrier associated with the access components 206 is not licensed to transmit signals.

With continued reference to FIG. 2, core components 208 may include several components that perform various functions within the wireless communications network 210. For example, an LTE network may include an MME, SGW, and PGW for communicating with the mobile device 202, routing and forward packets, and providing connectivity to external networks. In other networks, core components 208 may also include an RNC for managing radio channels, power control, load control, admission control, packet scheduling, handover control, macro-diversity, security functions, and mobility management. An additional core components illustrated in FIG. 2 is the frequency band interference component 212 that manages functions related to identifying frequency band interferences. Further, several components shown in FIG. 2 may be combined into a single component or implement separate different from the representation shown in FIG. 2.

The components illustrated in FIG. 2 may communicate with one another by way of the wireless communications network 210.

With continued reference to FIG. 2, the frequency band interference component 212 is generally responsible for managing information that is used to identify the frequency band interference of a frequency carrier. The frequency band interference component 212 may include a processor unit 214 and a comparison unit 216. More specifically, the frequency band interference component manages the mobile device activity record and the spectrum license record using the processor unit 214. The mobile device 202 generates the frequency activity used in the mobile device activity record. The mobile device activity record identifies the frequency on which a mobile device was operated and the geographic location from which the frequency was used. For example, the mobile device connects to the wireless communications network 210 for services (e.g., voice and messaging services) and running applications on the mobile device (e.g., video, voice, and texts) and each connection is associated with a geographic location. The mobile device activity record may be generated based on any mobile device activity (e.g., established connection) with the wireless communications network 210. The mobile device activity record may also be generated, at least in part, using a client service on the mobile device 202 or may also be generated using a core component that aggregates and sorts the plurality of mobile device activities. It is contemplated within embodiments of the present invention that the mobile device may be in an active or idle connected session with the wireless communications network 210 when the mobile device activity record information is generated.

In addition to the frequency the mobile device 202 used, the mobile device activity record also includes the geographic location where the mobile device 202 used the frequency. Determining the geographic location of the mobile device may be based on location technology (e.g., GPS) of the wireless communications network 210. Positioning of the mobile device 202 may be a service provided by a core component to enable the network to support identifying frequency band interference. The wireless communications network 210 may support several different positioning methods (e.g., network-assisted GNSS; downlink positioning, enhanced cell ID method). In operation, the GNSS provides autonomous geospatial positioning with global and regional coverage, downlink positioning is based on measurements taken at the mobile device of signals from multiple cells, and the enhanced Cell ID is based on measurements from the serving cell of the mobile device 202. In embodiments, the geographic location is measured in terms of latitude and longitude; however other positioning measurements are contemplated with embodiments of the present invention. Several factors affect the geographic location identified (e.g., travel, obstructions, signal noise). The accuracy of the geographic location identified may also vary with each positioning technology. For example, a 2D fix—a two-dimensional (latitude and longitude) position compared to a 3D fix—a three-dimensional (latitude, longitude, and height) position. It is contemplated that entries in the mobile device activity record may be filtered out from further processing based on the accuracy (e.g. predetermined accuracy threshold) of the associated geographic location in the entry.

The frequency band interference component 212 also manages the spectrum license record. The spectrum license record includes, for a plurality of frequency carriers, an assigned frequency band and an assigned geographic location. In embodiments, the spectrum license record is retrieved from a source external to the wireless communications network 210, where the spectrum record may include additional spectrum management data. As discussed, usage of frequencies may be regulated using spectrum management, thus frequency bands may be assigned to a number of geographic locations (e.g. Trading Area). For example, the 1900 MHz band (1850-1990 MHz) may be divided into six frequency blocks (A through F). Each block between 10 MHz and 30 MHz bandwidth. Licenses (A to B) may be granted for a Major Trading Areas (MTA) and licenses (C to F) may be granted for a Basic Trading Area. There are 51 MTAs and 493 BTAs in the United States where BTAs are located within MTAs. A wireless communications network provider (or other interested parties) may bid on a trading area with the winner assigned the frequency band. The spectrum license record may be a publication including each frequency band, geographic location, and the associated frequency carrier. In embodiments, the spectrum license record may be filtered to include only the frequencies and geographic location for the particular frequency carrier for which the interference identification operation is being performed for. For exemplary purposes, a spectrum license record entry may include: a frequency carrier BTA Number; BTA_State; Square Miles; MTA Name; Square Miles frequency band; and channels.

With the identified frequencies used by the mobile device and the geographic location where each frequency was used, the frequency band interference component 212 also operates to compare the mobile device activity record to the spectrum license record. The comparison may be performed using the comparison unit 216. Comparing the mobile device activity record to the spectrum license record may identify several different types of transmission for determining whether a frequency band interference may have occurred.

Figure 3A:
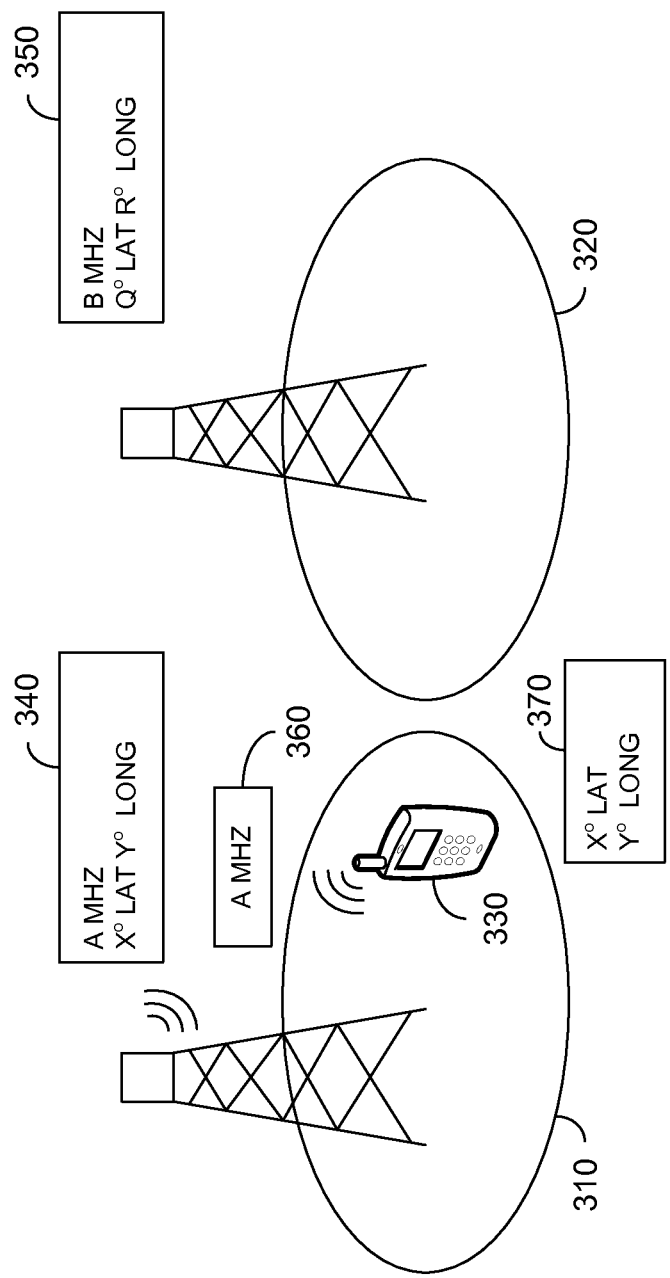
FIGS. 3A-3D depict a flow diagram illustrating a method for identifying frequency band interference of a frequency carrier based on a mobile device activity record, in accordance with an embodiment of the present invention.

For exemplary purposes, FIGS. 3A-3D include a first cell 310, a second cell 320, and a mobile device 330. The first cell has a first license 340 to transmit signals within a geographic region associated with a first cell 310 and the second cell has a second license 350 to transmit signals within another geographic region associated with second cell 320. In FIG. 3A, no interference occurs when the mobile device uses a frequency 360 within the assigned frequency band and the mobile device 330 is inside the geographic location 370. In this example, the frequency carrier is transmitting inside the assigned frequency band and within the geographic location; this transmission does not interfere with another frequency carrier with the second license 350.

Figure 3B:
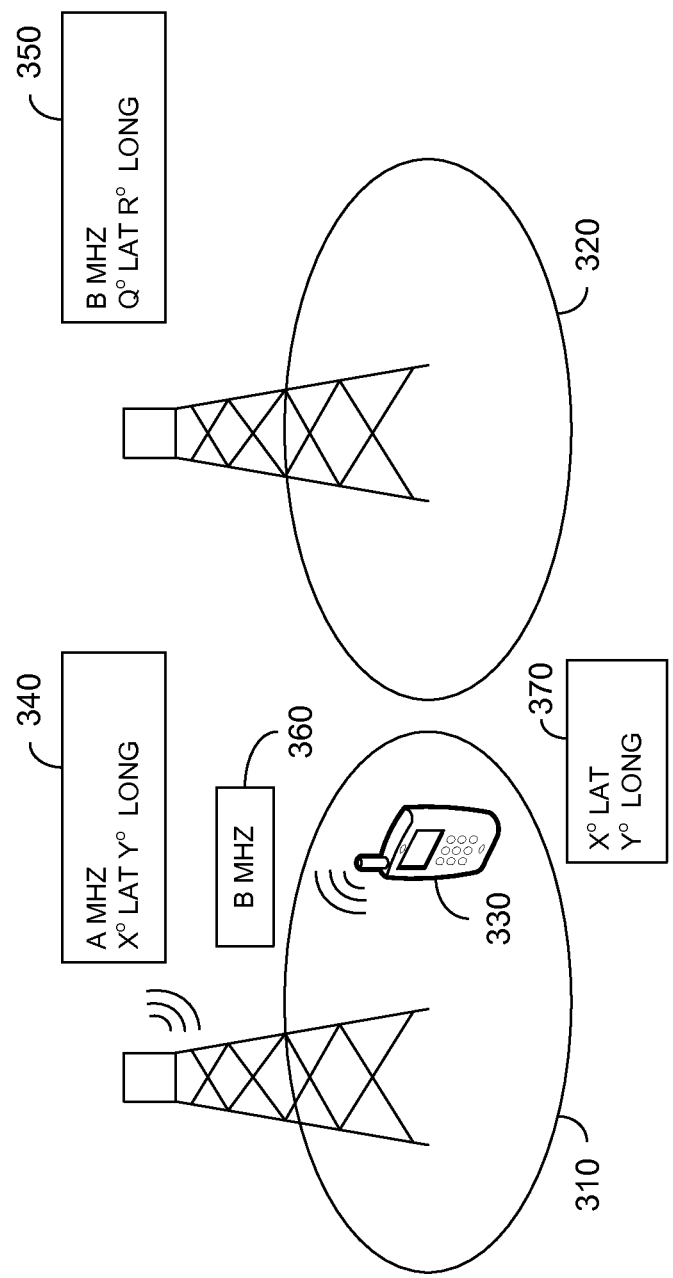

With continued reference to FIG. 3B, interference occurs when the mobile device 330 uses a frequency 360 outside the assigned frequency band and the mobile device 330 is inside the geographic location 370. In this example, the frequency carrier is transmitting outside an assigned frequency band but within the geographic location; thus this transmission may interfere with another frequency carrier assigned the frequency used by the mobile device 330 within the geographic location.

Figure 3C:
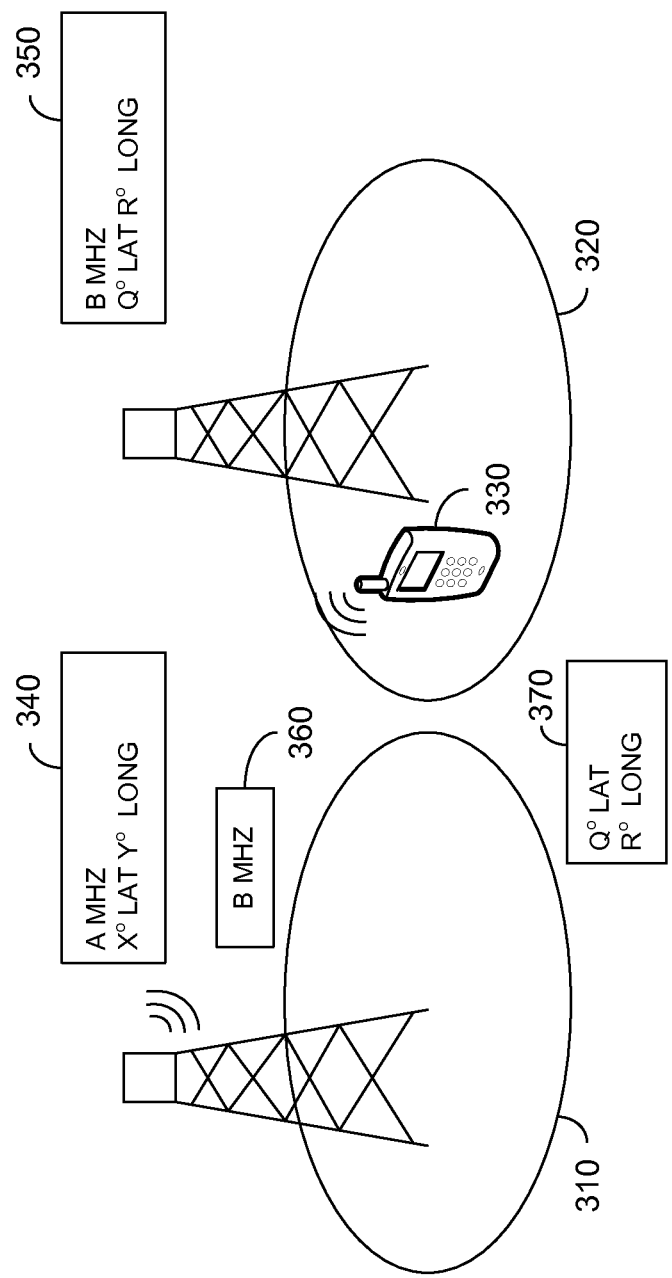

In FIG. 3C, interference also occurs when the mobile device 330 uses a frequency 360 outside the assigned frequency band and the mobile device is outside the assigned geographic location and in another geographic location 370. In this example, the frequency carrier is transmitting outside an assigned frequency band and outside the assigned geographic location, thus this transmission may interfere with another frequency carrier assigned the frequency used by the mobile device in the geographic location where the mobile device used the frequency.

Figure 3D:
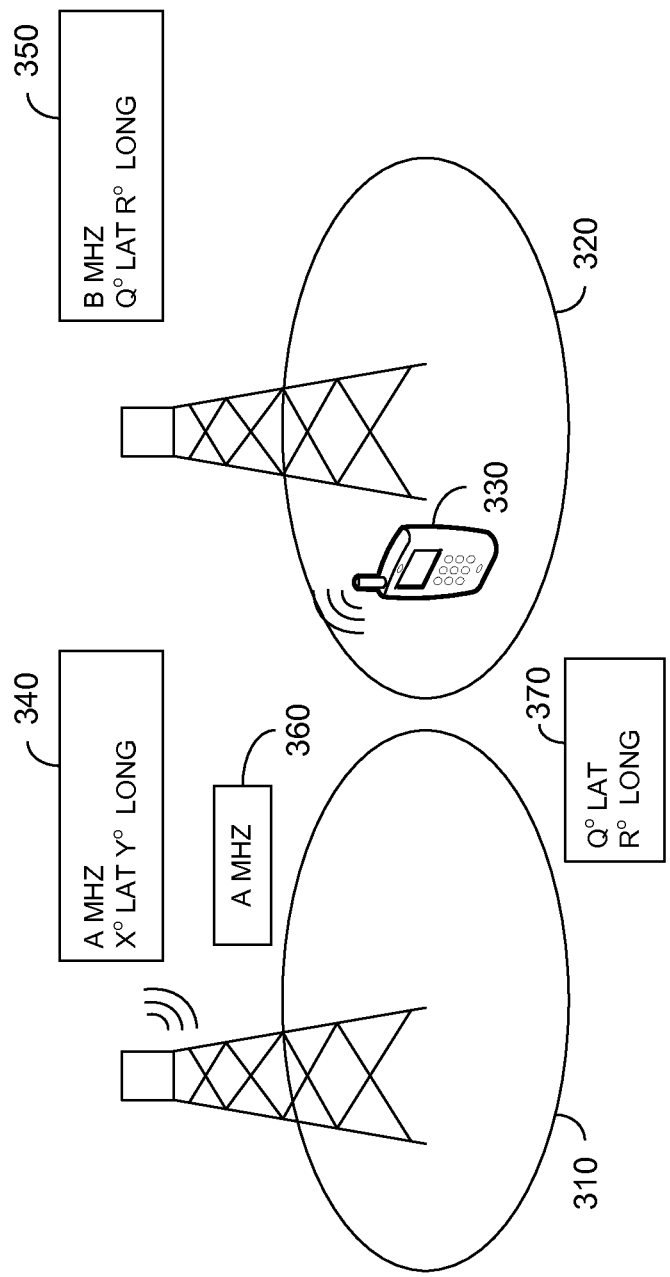

Finally, in FIG. 3D, interference also occurs when the mobile device 330 uses a frequency 360 within the assigned frequency band; however the mobile device 330 is outside the assigned geographic location and in another geographic location 370. In this example, the frequency carrier is transmitting on the assigned frequency band, but beyond the assigned geographic location, thus this transmission may interfere with another frequency carrier assigned the same frequency in the other geographic location.

Embodiments of the present invention may distinguish between potential interference and actual interference. As such, identifying frequency band interference may refer to potential interference or actual interference as discussed herein. Potential interference may refer to anticipated interference based on the frequency carrier transmission error of an access component (e.g., eNode, BTS). Actual interference may refer to interferences occurring on the frequency band because the rightfully licensed frequency carrier also transmits on the frequency band during the transmission error. Further, whether identifying a potential interference or actual interference, identifying interference may be associated with several different factors. For example, the frequency error—the difference between the frequency transmitted and the frequency assigned. Also, distance error—the difference between the geographic location boundaries of the assigned geographic location and the location where the frequency was used by the mobile device.

Further, a signal strength/quality of the mobile device when using the frequency may also be a factor. In the procedure of cell selection the mobile device 206 measures two parameters of a reference signal: RSRP (Reference Signal Received Power) and RSRQ (Reference Signal Received Quality). The mobile device 206 measures the average received power over the resource elements that carry cell-specific reference signals within a certain frequency bandwidth. RSRQ is a measurement and it indicates the quality of the received reference signal. This measurement of the signal strength/signal quality of a cell when the mobile device used the frequency may be factored into a finding of interference. Any and all such factors, and combinations thereof, are contemplated within the scope of embodiments of the present invention. These factors may be associated with predetermined threshold measurements for determining interference.

It is further contemplated within embodiments of the present invention that upon determining that a frequency band interference has occurred, a remedial action may be performed to repair the frequency band interference of a base station associated with the frequency band interference. Remedial actions may differ depending on whether the interference is a potential interference or an actually interference. Remedial actions may also turn on whether the interference is determined to be a national interference or an international interference. In either case, remedial actions may generally include, for exemplary purposes, reconfiguring the base station to transmit using the assigned frequency band or reconfiguring the base station to transmit within the assigned geographic location.

Referring to FIG. 4, a flowchart illustrates a method 400 for identifying frequency band interference based on a mobile device activity record, in accordance with an embodiment of the present invention. Initially, at step 410, a mobile device activity record is received. The mobile device may be associated with the frequency carrier as a subscribed mobile device for wireless communications network service. The mobile device activity record comprises a plurality of frequencies used by the mobile device and for each frequency in the plurality of frequencies a geographic location where the frequency was used. The geographic location where each frequency was used may be provided in latitude and longitude measurements.

At step 420, the mobile device activity record is compared to a spectrum license record that comprises an assigned frequency band for an assigned geographic location. At step 430, it is determined that a frequency band interference has occurred based on identifying a frequency in the mobile device activity record when, according to the spectrum license record, the frequency is not licensed to a frequency carrier for the mobile device, in the geographic location where the frequency was used. The frequency band interference may be a potential interference or an actual interference, where the frequency band interference is a potential frequency band interference when the frequency band of the frequency identified is not in use by another frequency carrier and the frequency band interference is an actual frequency band interference when the frequency band of the frequency identified is in use by another frequency carrier.

FIG. 5 depicts a flowchart illustrating a method 500 for identifying frequency band interference based on a mobile device activity record. Initially, a cell having an assigned frequency band for an assigned geographic location is selected at step 510. At step 520, one or more entries having a frequency and a geographic location where the frequency was used are selected from the mobile device activity record associated with the cell. At step 530, the one or more entries having the frequency and the geographic location are compared to the assigned frequency band and the assigned geographic location. At step 540, it is determined that a frequency band interference has occurred based on identifying a frequency in the mobile device activity record when, according to the spectrum license record, the frequency is not licensed to a frequency carrier for the mobile device, in the geographic location where the frequency was used.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. Non-transitory computer-readable media having computer-executable instructions embodied thereon that, when executed, enable a computing device to perform a method for identifying frequency band interference based on a mobile device activity record, the method comprising:
    receiving the mobile device activity record, which comprises a plurality of frequencies used by a mobile device and for each frequency in the plurality of frequencies a geographic location where the frequency was used;
    comparing the mobile device activity record to a spectrum license record that comprises an assigned frequency band for an assigned geographic location; and
    determining that a frequency band interference has occurred based on identifying a frequency in the mobile device activity record when, according to the spectrum license record, the frequency is not licensed to a frequency carrier for the mobile device, in the geographic location where the frequency was used.

2. The media of claim 1, wherein the mobile device is associated with the frequency carrier as a subscribed mobile device for wireless communications network service.

3. The media of claim 1, wherein the mobile device includes a client service for generating the mobile device activity record.

4. The media of claim 1, wherein the geographic location where each frequency was used is provide as a latitude and longitude location.

5. The media of claim 1, wherein one or more entries in the mobile device activity record are filtered out of the mobile device activity record based on a predetermined accuracy threshold of the geographic location.

6. The media of claim 1, wherein comparing the mobile device activity record to the spectrum license record further comprises:
   comparing each of the plurality of frequencies to the assigned frequency band; and
   comparing the geographic location for each of the plurality of frequencies to the assigned geographic location.

7. The media of claim 1, wherein comparing each of the plurality of frequencies to the assigned frequency band is based on channel information.

8. The media of claim 1, wherein comparing the geographic location for each of the plurality of frequencies to the assigned geographic location further comprises determining the geographic location is within a location boundary of the assigned geographic location.

9. The media of claim 1, wherein the frequency band interference is a potential frequency band interference when the frequency band of the frequency identified is not in use by another frequency carrier.

10. The media of claim 1, wherein the frequency band interference is an actual frequency band interference when the frequency band of the frequency identified is in use by another frequency carrier.

11. The media of claim 1, wherein upon determining that the frequency band interference has occurred, performing a remedial action to repair the frequency band interference of a base station associated with the frequency band interference.

12. The media of claim 11, wherein the remedial action comprises performing one or more of the following on the base station:
   reconfiguring the base station to transmit using the assigned frequency band; and
   reconfiguring the base station to transmit within the assigned geographic location.

13. Non-transitory computer-readable media having computer-executable instructions embodied thereon that, when executed, enable a computing device to perform a method for identifying frequency band interference based on a mobile device activity record, the method comprising:
   selecting a cell having an assigned frequency band for an assigned geographic location;
   selecting from the mobile device activity record associated with the cell, one or more entries having a frequency and a geographic location where the frequency was used;
   comparing the one or more entries having the frequency and the geographic location to the assigned frequency band and the assigned geographic location;
   determining that a frequency band interference has occurred based on identifying a frequency in the mobile device activity record when, according to a spectrum license record, the frequency is not licensed to a frequency carrier for a mobile device, in the geographic location where the frequency was used.

14. The media of claim 13, wherein the cell and the one or more entries are associated based on a sector name for the cell.

15. The media of claim 13, wherein the cell and the one or more entries are associated based on trading area.

16. The media of claim 13, wherein the frequency band interference is for a national geographic location.

17. The media of claim 13, wherein the frequency band interference is for an international geographic location.

18. A system for identifying frequency band interference based on a mobile device activity record, the system comprising:
   a mobile device configured for:
   (1) generating a mobile device activity for the mobile device activity record, which comprises a plurality of frequencies used by the mobile device and for each frequency in the plurality of frequencies a geographic location where the frequency was used;
   a frequency band interference component configured for:
   (1) receiving the mobile device activity record;
   (2) comparing the mobile device activity record to a spectrum license record that comprises an assigned frequency band for an assigned geographic location; and
   (3) determining that the frequency band interference has occurred based on identifying a frequency in the mobile device activity record when, according to the spectrum license record, the frequency is not licensed to a frequency carrier for the mobile device, in the geographic location where the frequency was used.

19. The system of claim 18, wherein the frequency band interference component is further configured for:
   (1) comparing each of the plurality of frequencies to the assigned frequency band; and
   (2) comparing the geographic location for each of the plurality of frequencies to the assigned geographic location.

20. The system of claim 19, wherein the frequency band interference component is further configured for:
   communicating a determination of frequency band interference such that a remedial action to repair the frequency band interference of a base station associated with the frequency band interference is performed.

* * * * *